(12) United States Patent
Weinstein et al.

(10) Patent No.: US 9,584,541 B1
(45) Date of Patent: Feb. 28, 2017

(54) CYBER THREAT IDENTIFICATION AND ANALYTICS APPARATUSES, METHODS AND SYSTEMS

(71) Applicant: Lookingglass Cyber Solutions, Inc., Baltimore, MD (US)

(72) Inventors: Steven Weinstein, Baltimore, MD (US); Allan Thomson, Pleasanton, CA (US)

(73) Assignee: Lookingglass Cyber Solutions, Inc., Baltimore, MD (US)

( * ) Notice: Subject to any disclaimer, the term of this patent is extended or adjusted under 35 U.S.C. 154(b) by 0 days.

(21) Appl. No.: 14/621,206

(22) Filed: Feb. 12, 2015

(51) Int. Cl.
| | |
|---|---|
| G06F 11/00 | (2006.01) |
| G06F 12/14 | (2006.01) |
| G06F 12/16 | (2006.01) |
| H04L 29/06 | (2006.01) |

(52) U.S. Cl.
CPC ...... *H04L 63/145* (2013.01); *H04L 29/06884* (2013.01); *H04L 29/06911* (2013.01); *H04L 29/06877* (2013.01)

(58) Field of Classification Search
CPC .......... G06F 21/56; G06F 21/57; G06F 21/60; H04L 29/06911; H04L 29/06877; H04L 29/06884
USPC ............................................... 726/22, 23, 24
See application file for complete search history.

(56) References Cited

U.S. PATENT DOCUMENTS

| | | | | |
|---|---|---|---|---|
| 6,973,578 | B1* | 12/2005 | McIchione | G06F 21/563 713/188 |
| 7,251,830 | B1* | 7/2007 | Melchione | G06F 21/563 713/188 |
| 8,214,977 | B2* | 7/2012 | Szor | G06F 21/56 26/24 |
| 8,239,668 | B1* | 8/2012 | Chen et al. | 713/150 |
| 8,266,698 | B1* | 9/2012 | Seshardi | G06F 21/53 726/22 |
| 8,302,191 | B1* | 10/2012 | Conrad | G06F 21/56 726/22 |
| 8,910,284 | B1* | 12/2014 | Erdmann | G06F 21/552 706/23 |
| 2007/0169194 | A1* | 7/2007 | Church et al. | 726/23 |
| 2014/0366137 | A1* | 12/2014 | Tatarinov | 726/24 |

(Continued)

OTHER PUBLICATIONS

A parameter-free hybrid clustering algorithm used for malware categorization, Han et al, Anti-counterfeiting, Security, and Identification in Communication, 2009. ASID 2009. 3rd International Conference, IEEE Aug. 20-22, 2009.*

(Continued)

*Primary Examiner* — Luu Pham
*Assistant Examiner* — Jahangir Kabir
(74) *Attorney, Agent, or Firm* — Cooley LLP

(57) ABSTRACT

The cyber threat identification and analytics ("CTIA") apparatuses, methods and systems, for example, identify a list of relevant malware indicators of compromise (IOCs) during a cyber security incident. The CTIA system automatically groups relevant malware IOCs from all known samples of a particular threat, given either a threat or a specific IOC without knowing the threat. In this way, an incident responder can use the group of relevant malware IOCs to have the highest probability of locating infections of variations of malware of the particular threat.

21 Claims, 8 Drawing Sheets

(56) References Cited

U.S. PATENT DOCUMENTS

2016/0092683 A1* 3/2016 Mityagin ............ H04L 63/1433
726/24

OTHER PUBLICATIONS

Patterns of a cooperative malware analysis workflow, Plohmann et al, Cyber Conflict (CyCon), 2013 5th International Conference, IEEE Jun. 4-7, 2013.*

* cited by examiner

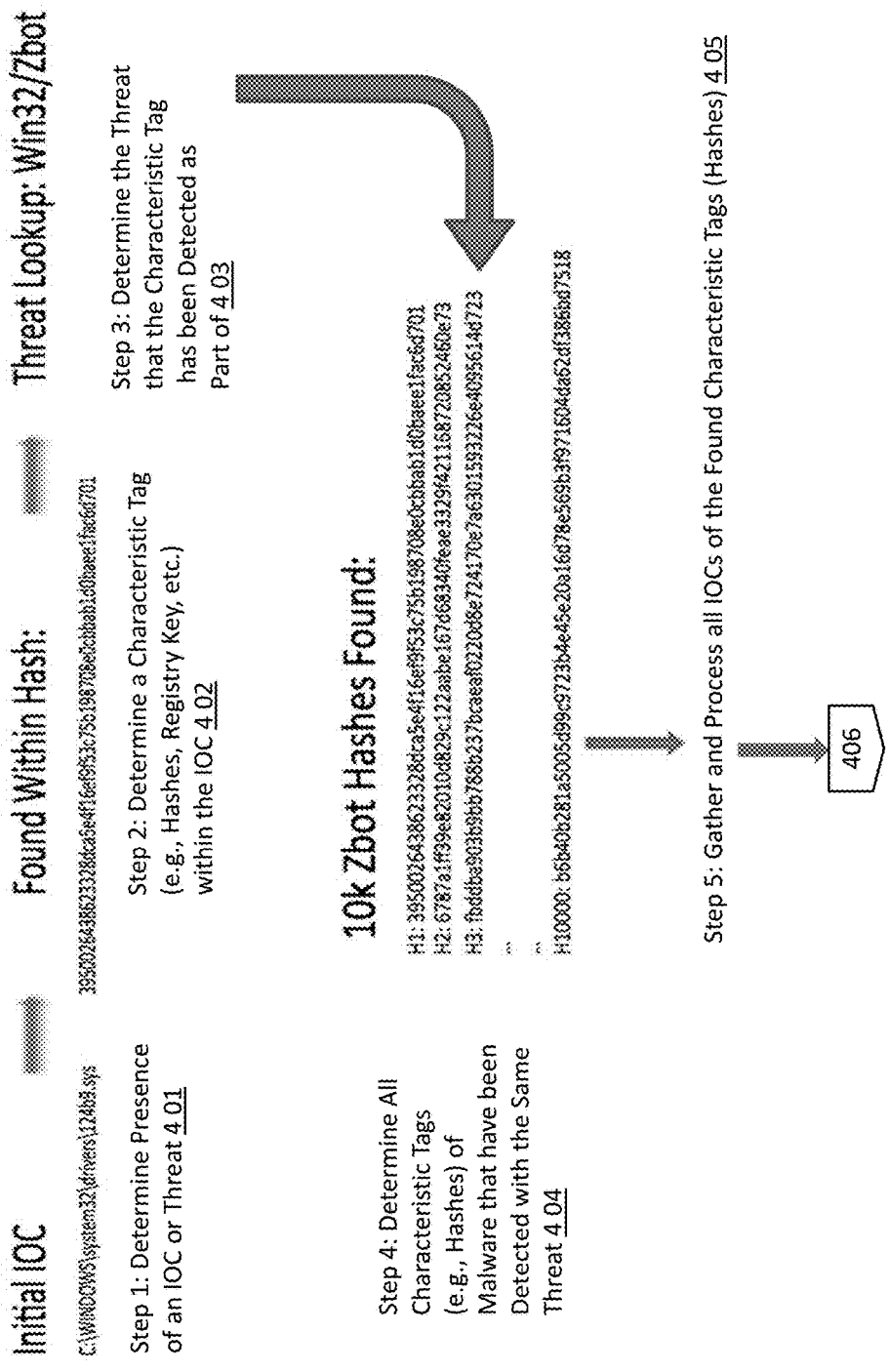

FIG. 4B

List IOCs for all Zbot Hashes    405a

H1
c:\autoexec.bat
C:\WINDOWS\system32\drivers\12459.sys
c:\Documents and Settings\janettedoe\Local Settings\Temporary Internet Files
\Content.IE5\VQJY2KOZ\y5Q11[1.js
C:\Documents and Settings\janettedoe\Local Settings\Temporary Internet Files
\Content.IE5\VYQJY2KEZ\xyfe[1].css
0x00000000a6\\ShellEx\IconHandler
HKEY_LOCAL_MACHINE\System\Setup
HKEY_LOCAL_MACHINE\SOFTWARE\Microsoft\V8A\Monitors
Local\{340FE312E-111C-2AB3-8F92-61FC8A8C42EE}
perezdas.com
65.55.56.206
193.37.198.162

H2
c:\autoexec.bat
C:\WINDOWS\Windowshell.manifest
C:\Documents and Settings\janettedoe\Application Data\wuma.jaa
C:\Program Files\Javay\enbin\javaw.exe
C:\Documents and Settings\user\Local Settings\Temporary Internet Files
\Content.IE5\S36VVPMRU\pepas[1].css
HKEY_LOCAL_MACHINE\Software\Microsoft\Internet
Explorer\Main\FeatureControl\RETRY_HEADERONLYPOST_ONCONNECTIONRESET
maxbantista.com
65.55.56.206
64.4.10.33

H3
c:\autoexec.bat
C:\WINDOWS\system32\msdtime.exe
c:\documents and settings\janettedoe\Application Data\wuma.jaa.dat
C:\WINDOWS\system32\wspatres.dll
C:\Documents and Settings\User\Cookies\index.dat
c:\documents and settings\janettedoe\Application Data\wuma.jaa
C:\WINDOWS\system32\msirm.Hb
HKEY_LOCAL_MACHINE\SOFTWARE\VMware, Inc.\VMware Tools
HKEY_LOCAL_MACHINE\Software\Borland\Delphi\Locales
HKEY_USERS\Domains\bank
HKEY_CURRENT_USER\Software\Borland\Delphi\Locates
HKEY_CURRENT_USER\SOFTWARE\Policies\Microsoft\Windows\CurrentVersion\Internet Settings
64.4.10.33
89.28.59.186

... H10000
c:\autoexec.bat
c:\documents and settings\janettedoe\Application Data\wuma.jaa.dat
C:\WINDOWS\system32\macroconnect\flash\flash.ocx
C:\WINDOWS\system32\en-US\jscript.dll.mui
HKEY_LOCAL_MACHINE\SOFTWARE\Oracle\VirtualBox Guest Additions
HKEY_LOCAL_MACHINE\Software\Microsoft\Internet Explorer\Main\FeatureControl
HKEY_HEADERONLYPOST_ONCONNECTIONRESET
HKEY_LOCAL_MACHINE\Software\Microsoft\Internet Explorer\Main\FeatureControl
FEATURE_BFX_CHUNKED_PROXY_SCRIPT_DOWNLOAD_KB843289
vikroyalista.com
65.55.56.205
64.4.10.33

⟹

406
Step 6: Determine Statistically Relevant IOCs c:\autoexec.bat
C:\Documents and Settings\janettedoe\Application Data\wuma.jaa.dat
C:\Documents and Settings\janettedoe\Application Data\wuma.jaa
HKEY_LOCAL_MACHINE\Software\Microsoft\
c:\documents and settings\user\local settings\history\history.ie5\
65.55.56.206
64.4.10.33

CYBER THREAT IDENTIFICATION AND ANALYTICS APPARATUSES, METHODS AND SYSTEMS

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

Some embodiments generally relate to apparatuses, methods, and systems for cyber security management and more particularly, relate to cyber threat identification and analytics ("CTIA") apparatuses, methods and systems.

BACKGROUND

Computer malware is a type of software that disrupts the normal operation of a computer, and introduces security risk to a network of computers and any asset connected to the computer network. A malware instance can, for example, send malicious code programs to a computer so as to burden the processing capacity of the computer, gain access to secured data without authorization, or modify critical system settings. Anti-malware programs are designed to detect potential threats of malware. When a computer is attacked by malware, a computer user can experience abnormal symptoms on the computer. Different malware attacks can cause different abnormal symptoms to the computer, for example, hardware troubles, slow performance, missing files, and/or the like.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure.

FIGS. 4A-4B provide example logic diagrams illustrating an example of threat lookup and identification based on an initial IOC, according to an embodiment.

SUMMARY

Figure 1A:
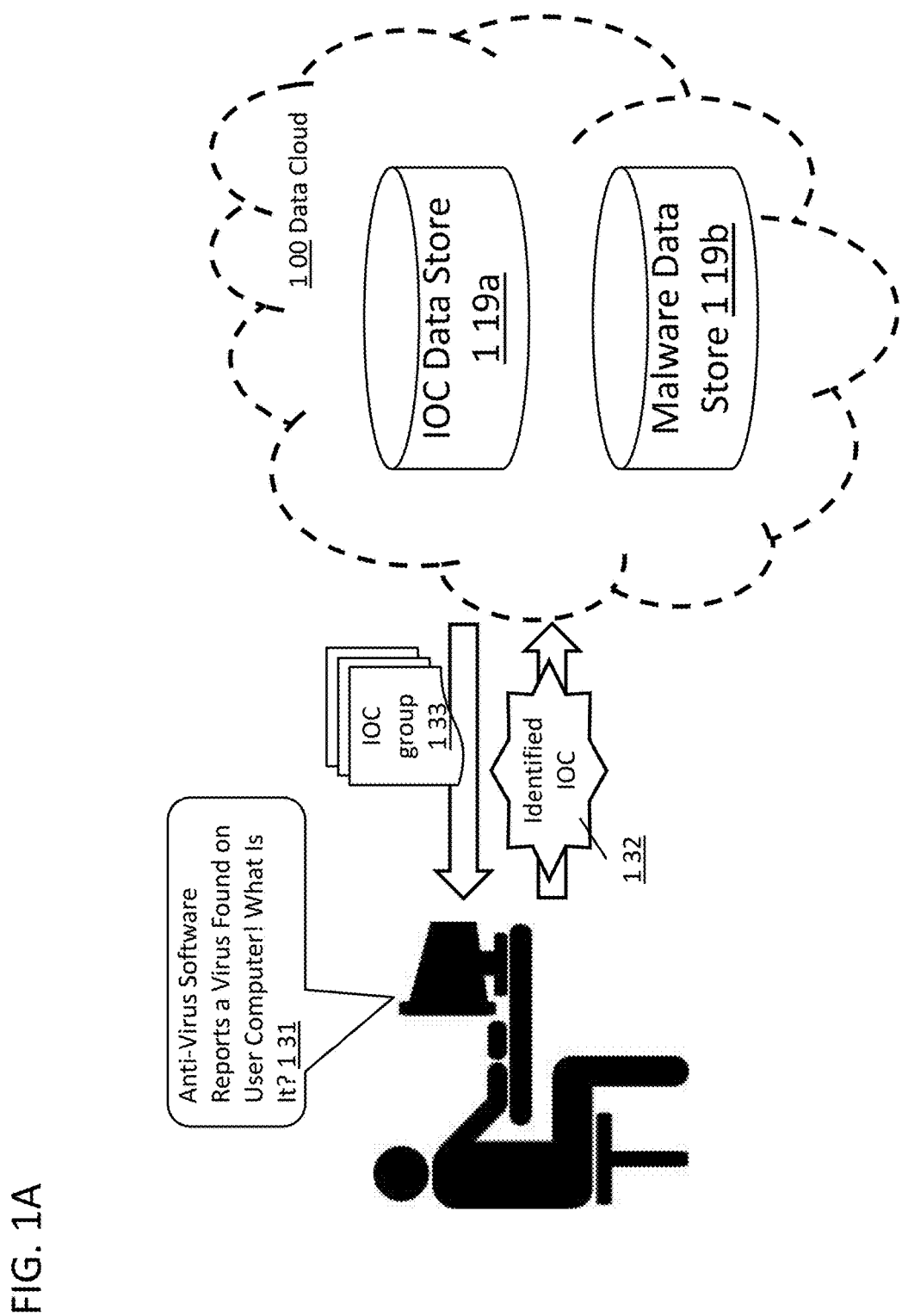
FIG. 1A provides a combined logic and data message flow block diagram illustrating an example of identifying a list of relevant indicators of compromise (IOCs) in response to an identified IOC, according to an embodiment.

The cyber threat identification and analytics ("CTIA") apparatuses, methods and systems, for example, identify a list of relevant malware IOCs during a cyber-security incident. In one embodiment, the CTIA apparatus comprises a processor and a memory operatively coupled to the processor. The memory stores processor-readable instructions executable by the processor to: receive an input message including an indicator of compromise, and to identify a type of a threat based on the indicator of compromise when the threat is unidentified by the indicator of compromise. When the threat is identified by the indicator of compromise, the CTIA apparatus can identify all samples of malware that have been detected as that threat, and compile a first group of previously-stored indicators of compromise associated with the identified samples of malware. The CTIA apparatus can compile a second group of previously-stored indicators of compromise that are statistically relevant to the threat based on the first list of previously-stored indicators. The second group of previously-stored indicators including indicators of compromise is from the first group of previously-stored indicators and reaches a relevance level to the threat. The CTIA apparatus can generate an output message including the second group of previously-stored indicators of compromise in response to the input message.

In one embodiment, a processor-implemented method performed by the CTIA apparatus is disclosed. The CTIA apparatus identifies presence of an indicator of compromise at a source, and then determines a characteristic named-observation associated with the first indicator of compromise. The CTIA apparatus forms a query on a set of previously-identified samples of malware based on the characteristic named-observation to identify a sample of malware that is associated with the characteristic named-observation. The query thereby identifies a threat that is associated with the sample of malware. The CTIA apparatus then identifies a set of samples of malware that are associated with the identified threat based on the set of previously-identified samples of malware, based on which the CTIA apparatus determines a set of indicators of compromise. Each indicator of compromise from the set of indicators of compromise is associated with at least one sample of malware from the set of samples of malware. The CTIA apparatus can then generate an output group of statistically relevant indicators of compromise from the determined set of indicators of compromise, which reaches a relevance level to the threat.

In one embodiment, a system is disclosed. The system includes an indicator-of-compromise analyzer configured to receive an indicator of compromise and search a data store of indicators of comprise for the indicator of compromise to identify a sample of malware that contains the indicator of compromise, to identify a threat. The system further includes a threat analyzer operatively coupled to the indicator-of-compromise analyzer. The threat analyzer is configured to search a data store of malware information based on the identified sample of malware to identify a set of samples of malware detected as the threat. The threat analyzer is further configured to compile a first group of previously-stored indicators of compromise associated with the set of the samples of malware detected as the threat. The system further comprises a cluster analyzer operatively coupled to the threat analyzer. The cluster analyzer is configured to generate an output group of statistically clustered indicators of compromise from the first group of previously-stored indicators of compromise, the statistically clustered indicators of compromise reaching a relevance level to the threat.

DETAILED DESCRIPTION

Incident responders (e.g., information technology administrators, cyber threat analyst, and/or automatic cyber threat monitoring systems, etc.) can be in a situation in which they have come across an IOC but do not know what type of threat it is related to. The incident responders normally can check for IOCs related to the threat, but the number of variants of malware or the number of IOCs related to the same threat could be significantly high (e.g., an average of 160,000 new malware can be generated every day, etc.), and thus makes it extremely difficult or even impossible to inspect manually (or with non-trivial human involvement) every malware.

Some embodiments of the cyber threat identification and analytics ("CTIA") apparatuses, methods and systems described herein, for example, can identify a list of relevant malware indicators of compromise (IOCs) during a cyber-security incident. Such a cyber-security incident can be, for example, a cyber attack that can disrupt the normal operation of a computer, including different types of cyber threats such as but not limited to Trojans, countermeasure, unpatched software, phishing attacks, etc. The CTIA system can, for example, automatically group relevant malware IOCs from all known samples of a particular threat given either an identified threat or a specific IOC without specific knowledge of an identified threat. In this way, an incident responder can use the group of relevant malware IOCs to have the highest probability of locating infections of variations of malware of the particular threat.

The CTIA system can determine statistically relevant malware IOCs, for example, by analyzing behavioral malware analysis data to automatically identify (e.g., without human intervention) the most relevant malware IOCs related to a threat. Such behavioral malware analysis data can be, for example, data that indicates or presents changes made to a computer when the computer is attacked by malware, such as but not limited to network activities, registry key changes, files added/modified/removed in a file system on the computer, etc. Given a large data set of behavioral malware analysis results from the execution of malware at mass scale, the CTIA system allows incident responders to be provided a list of actionable IOCs so that the incident responders can identify the same malware or threat based on previously stored IOCs during incident response, thereby greatly improving the chance of successful remediation of cyber risk. The CTIA system can group IOCs from all samples of malware of the same threat type to determine the most relevant IOCs, without brute-force examination of mass amounts of behavioral malware analysis data to determine which IOCs to use during incident response. In this way, the incident responders can identify a threat in response to an IOC having the highest probability of locating infections of variations of malware of the particular threat based on the previously-stored relevant IOCs. As a consequence, incident responders need not inspect a large volume of variants of malware. Thus, response times to threats are reduced and the likelihood of a remediation of threats is increased before damage to the computer at attack occurs or the performance of that computer deteriorates, which in turn saves resources to maintain cyber security.

FIG. 1A provides a block diagram illustrating an example of identifying a list of relevant indicators of confidence (IOCs) in response to an identified IOC, according to an embodiment. For example, a computer user may receive a notification from an anti-virus software on the user computer that a virus is found on the computer, and the anti-virus software running on the computer may help identify what the virus is, e.g., 131. In one implementation, the anti-virus software may initiate a search locally to identify related threats or malware. In another implementation, however, given the voluminous information of related threats, the threat and/or malware may be stored at a data cloud 100, and the user computer may remotely access the data cloud 100 to form a search for related threats or malware. For example, the data cloud 100 may be maintained by a data provider such as VirusTotal, which has been derived from the collection and execution (behavioral malware analysis) of millions of pieces of malware, and provides a private application programming interface (API) for data requesters to obtain behavioral malware analysis results (e.g., IOCs) from a given piece of malware.

The user computer can send identifying information of the detected virus, e.g., a hash 132, to the data cloud too, which can comprise an IOC data store 119a, a malware data store 119b, and/or the like. Alternatively, the identifying information of the detected virus can be any other form of a characteristic named-observation (e.g., registry keys, file names and paths, mutexes, imported libraries and functions, unique strings, or network entity identifiers including domains and IP addresses). The data cloud too can be part of, or maintained by the CTIA system, or alternatively be maintained by a third party data service vendor. The CTIA system may generate a list of statistically relevant IOCs 133 based on the identified IOC, in response to the hash 132 obtained from the initial virus IOC so that the user computer can analyze the threat based on the relevant IOCs. Further discussion and examples of generating statistically relevant IOCs are provided in FIGS. 3A-3B and 4A-4B.

Figure 1B:
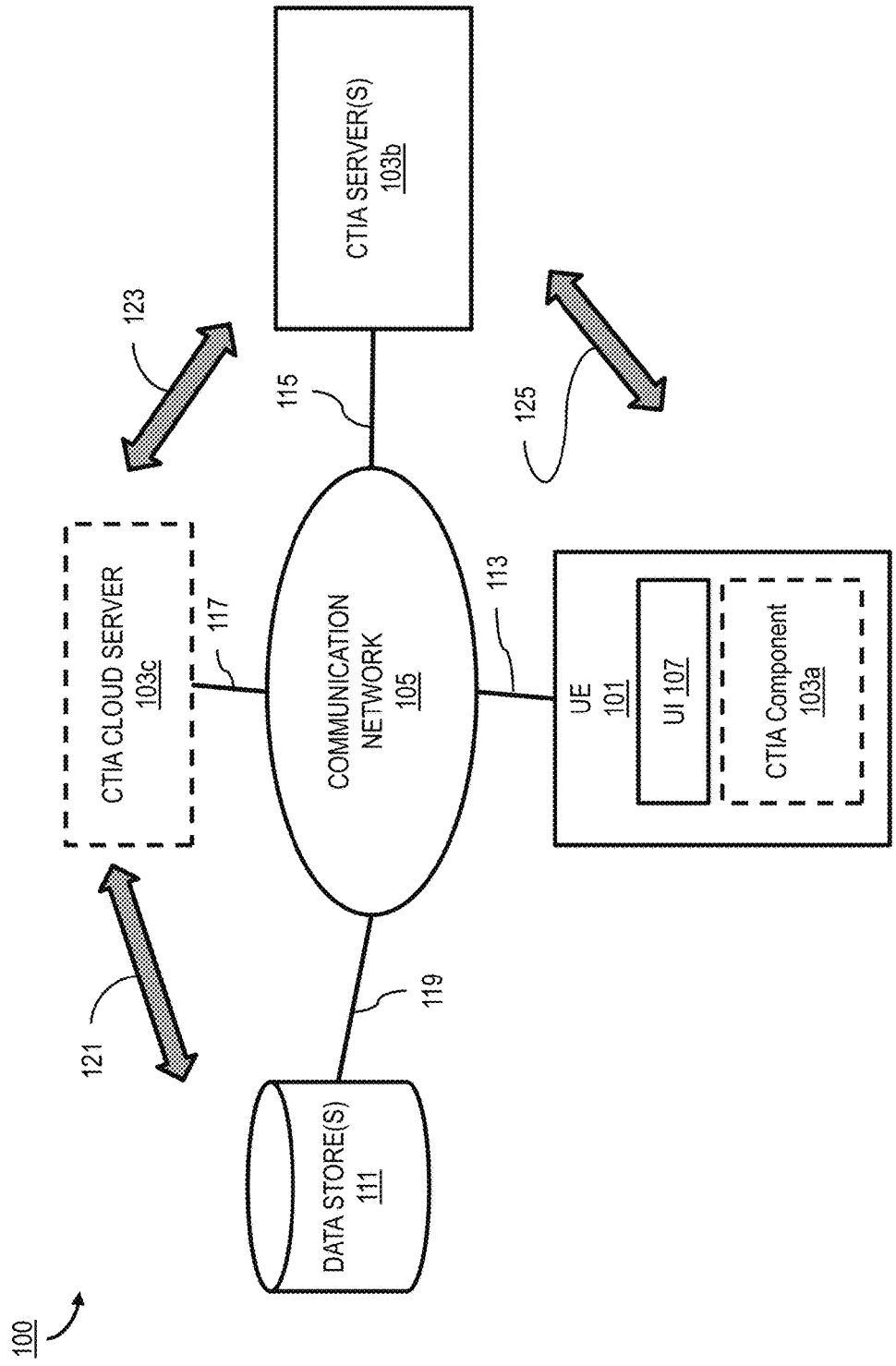
FIG. 1B provides a schematic block diagram of a communication network system in which CTIA aspects can be provided, according to an embodiment.

FIG. 1B provides a schematic block diagram of a communication network system in which CTIA aspects (e.g., identifying a virus on a user computer at 131, sending a hash to data cloud at 132, and receiving a relevant IOC group from the data cloud at 133 as shown in FIG. 1A) can be provided, according to an embodiment. A communication network system 100 can include one or more user devices or user equipment (UEs) 101, each equipped with at least a user interface (UI) 107; one or more CTIA servers or components including a CTIA component 103a instantiated on the UE 101 (e.g., the CTIA can be operated locally on a user device, etc.), a CTIA server 103b (e.g., a remote server that receives an IOC input and generates an output of statistically relevant IOCs), or alternatively (or in addition) a CTIA cloud server 103c (e.g., a cloud server that operates over a data cloud of IOC/malware data, etc.); one or more data sources 111, which are connected via a communication network 105. Any of the devices or servers of the communication network system 100 can be equipped with local memory/storage spaces (not shown in FIG. 1B). Furthermore, the devices and servers of the communication network system too may have access to centralized or distributed memory/storage spaces (not shown in FIG. 1B) through the communication network 105. Thus, FIG. 1A is merely an example illustrating the types of devices and modules that can be included within a communication network system 100.

Communication network 105 can be any communication network, such as the Internet, configurable to allow the one or more UEs 101, the one or more CTIA servers or components 103a-c, and the CTIA data sources 111 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the UEs 101 can be operatively coupled to a cellular network; and the data source(s) 111 can be operatively coupled to a fiber-optic network. The cellular network and fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1B, UEs 101 are operatively coupled to communication network 105 via network connection(s) 113; CTIA server(s) 103b and/or CTIA cloud server 103c are operatively coupled to communication network 105 via network connection(s) 115 or 117, respectively; and CTIA data source(s) 111 are operatively coupled to communication network 105 via network connection(s) 119. Network connections 113, 115, and 119 can be any appropriate network connection to operatively couple UEs 101, the CTIA server(s) 103b, and the data source(s) 111. In an alternative implementation, the CTIA server(s) 103b can have a direct connection with the UEs 101 via a communication connection 125.

A network connection can be a wireless network connection such as, for example, a wireless fidelity ("Wi-Fi®") or Wireless Local Area Network ("WLAN") connection, a Wireless Wide Area Network ("WWAN") connection, and/or a cellular connection. A network connection can be a wired connection such as, for example, an Ethernet connection, a Digital Subscription Line ("DSL") connection, a broadband coaxial connection, and/or a fiber-optic connection.

As mentioned above, in some instances, a communication network system 100 can include more than one UE 101, more than one CTIA server 103b, more than one CTIA cloud server 103c, and more than one data source ill. A UE 101 and/or a CTIA server 103b each can be operatively coupled to the communication network 105 for example by heterogeneous network connections. For example, a first UE 101 can be operatively coupled to the communication network 105 by a WWAN network connection, another UE 101 can be operatively coupled to the communication network 105 by a DSL network connection, and a CTIA server 103b can be operatively coupled to the communication network 105 by a fiber-optic network connection.

The CTIA server(s) 103b each can be, for example, a web server configured to provide search and/or data analytics capabilities to electronic devices, such as UEs 101. The UE 101 can be in communication with the CTIA server(s) log 9 via the communication network 105, while the communication is managed at least in part by the CTIA client component 103a. In one implementation, the CTIA server(s) 103b can be a remote server housed separately from the UE 101, where the CTIA client component 103a can include an application (e.g., a browser application, a mobile application, etc.) instantiated on a user device (e.g., a Smartphone, a computer, a workstation, a personal digital assistant, etc.). For example, the CTIA client component 103a can send a signal representing a control command (e.g., including a hash of a virus found on the UE, etc.) to the CTIA server(s) 103b for relevant IOCs, where the results of malware identification, e.g. a list of relevant IOCs may be sent to UE 101 and presented to a user via an output device of the UE 101. In another implementation, the CTIA server(s) 103b may be integrated with the UE 101 including the CTIA client component 103a. For example, the CTIA server 103b and UE 101 can collectively act as an integrated computing device operated by a user (e.g., via an input/output device of the UE 101), and communicate with various entities such as a data source, CTIA cloud server 103c, and/or the like. A detailed discussion of functional module(s) and data store(s) of the CTIA server 103b is provided in FIG. 2A. The CTIA component 103a and the CITA cloud server 103c, can be integrated with the CTIA server 103b, and have a similar structure as shown in FIG. 2A.

The UEs 101 can be any of a variety of electronic devices that can be operatively coupled to communication network 105. A UE 101 can be, for example, a personal computer, a tablet computer, a personal digital assistant (PDA), a cellular telephone, a portable/mobile internet device, television, kiosk display, display screens in vehicles, projection devices, laser display devices, digital display watches, digital display glasses and/or some other electronic communication device with audio and/or visual capabilities. A UE 101 can also be, for example, a television set, a streaming device, a set top box, or any other electronic device equipped with a display unit (a UI 107) and an interface to a network connection 113 that enables UE 101e to run applications with real-time contents received via the network connection 113 on an operating system. The UEs 101 each can include a web browser configured to access a webpage or website, for example, the CTIA client component 103a, which can be accessible over communication network 105. The UEs 101 can be configured to support, for example, Hyper Text Markup Language (HTML) using JavaScript. For example, the UEs 101 each can include a web browser, such as, Firefox®, Safari®, Dolphin®, Opera®, Internet Explorer (IE)®, Chrome® and/or similar browsers. An Internet page or website can be accessed by a user of a web browser at a UE 101 by providing the web browser with a reference such as a uniform resource locator (URL), for example, of a webpage. In some instances, UEs 101 each can include specialized software other than a browser for accessing a web server such as, for example, a CTIA server 103b. Specialized software can be, for example, a specialized network-enabled application or program. In some instances, portions of a website accessible via a web server can be located in a local or remote memory space/data store accessible to the web server. A UE 101 can also include a display, monitor or user interface (UI) 107, a keyboard, various ports (e.g., a USB port), and other user interface features, such as, for example, touch screen controls, audio components, and/or video components (each not shown).

Data source(s) 111 can be distributed sources of data throughout the communication network system 100. A data source 11i can be one or more of a database, a data warehouse, a file, etc. The data source(s) 111 can communicate with the CTIA cloud server 103c via a network connection 121, or be integrated with, or housed with the CTIA cloud server 103c and act as part of a data cloud of malware data. The CTIA server 103b and/or the CTIA component 103a can communicate with the data source(s) 111 to obtain cyber threat data via connections 113, 115 and 119 through the communication network 105. Or alternatively, the CTIA server 103b or the CTIA component 103a can access the CTIA cloud server 103c via the communication network 105 to load cyber threat data.

Figure 2A:
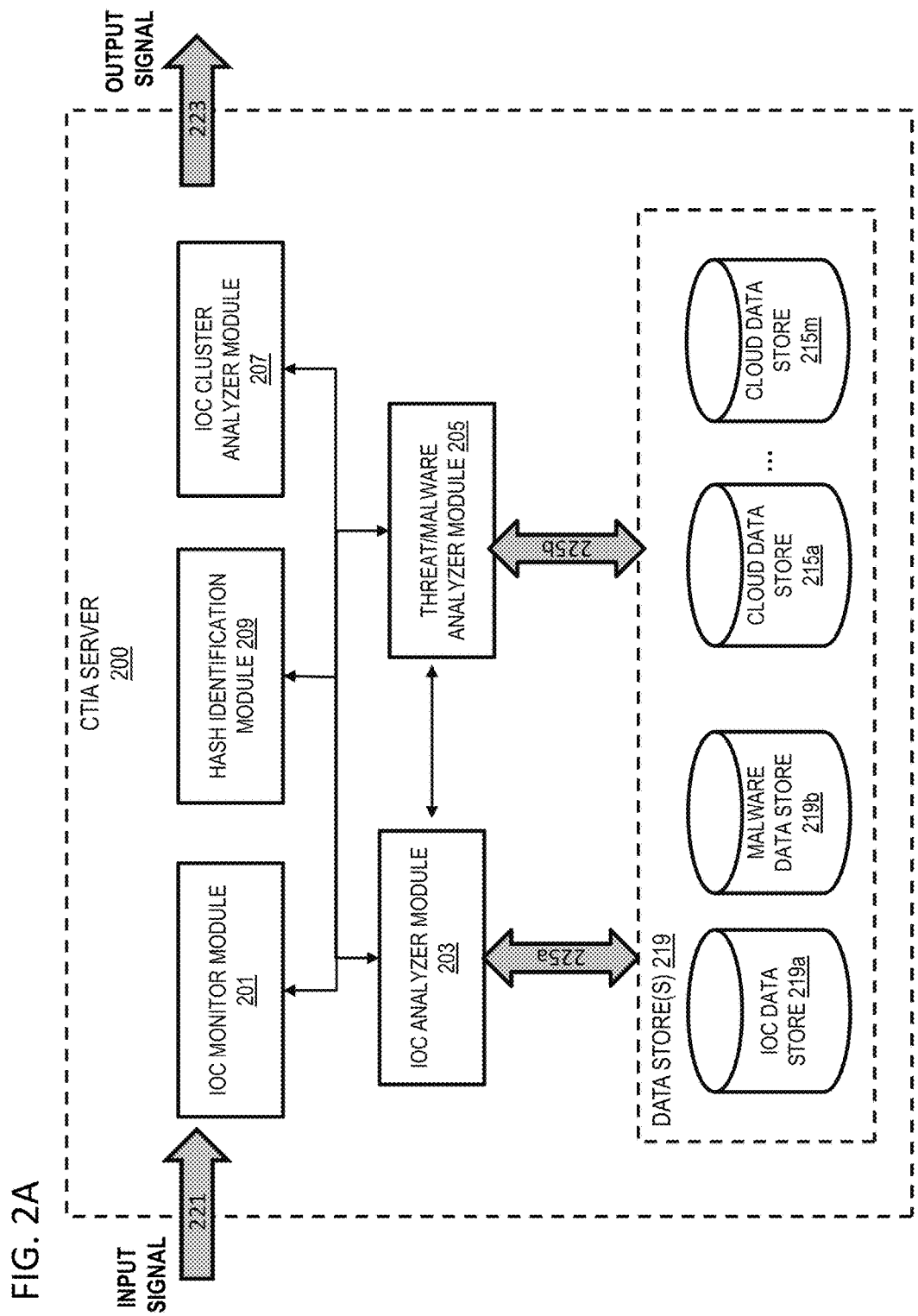
FIG. 2A is a schematic illustration of components and/or modules within a CTIA server, according to an embodiment.

FIG. 2A is a schematic illustration of components and/or modules within a CTIA server (e.g., 103b in FIG. 1B), according to an embodiment. The CTIA server 200 can be similar to the CTIA server 103b of FIG. 1B. As shown in FIG. 2A, a CTIA server 200 can include an IOC monitor module 201, an IOC analyzer module 203, a hash identification module 209, an IOC cluster analyzer module 207, a threat/malware analyzer module 205, and/or the like. A data store(s) 219 can include an IOC data store 219a, a malware data store 219b, and various cloud data store(s) 215a-m (which may be distributed or centralized). Furthermore, the CTIA server 200 communicates with other devices of a communication network system (e.g., communication network system 100 of FIG. 1A) via input signal 221 and output signal 223. For example, the input signal 221 can include a hash of a found or identified IOC (e.g., see 132 in FIG. 1A), and the output signal 223 can include a list of statistically relevant IOCs in response to the input hash of the found IOC (e.g., see 133 in FIG. 1A).

In various instances, the CTIA server 200 and its components can be located anywhere within a communication network system 100 such as that shown in FIG. 1B including, but not limited to, within the UEs 101, or in separate locations within the communication network system 100 of FIG. 1B. The CTIA server 200 can also be provided as on-premise deployment, via private computation clouds, or be embedded into other software or bundled into devices by Original Equipment Manufacturers (OEMs).

As used herein, a module can be, for example, any assembly and/or set of operatively-coupled electrical components, and can include, for example, a memory, a processor, electrical traces, optical connectors, software (executing or to be executed in hardware, or stored in memory) and/or the like. Furthermore, a module can be capable of performing one or more specific functions associated with the module, as discussed further below.

In some instances, the CTIA server 200 receives an input signal 221 representing an IOC (e.g., found or identified on a user computer under attack, etc.) at the IOC monitor module 201. The IOC monitor module 201 processes the IOC and sends it to the hash identification module 209 to identify a hash (and/or other characteristic named-observation of the IOC, including but not limited to a hash as a unique key, the hash including, for example, any of MD5, SHA1, SHA256 or SHA512) from the IOC. Information of the IOC (e.g., an identified hash, a timestamp, a description, etc.) can be stored at the IOC data store 219a.

Figure 2B:
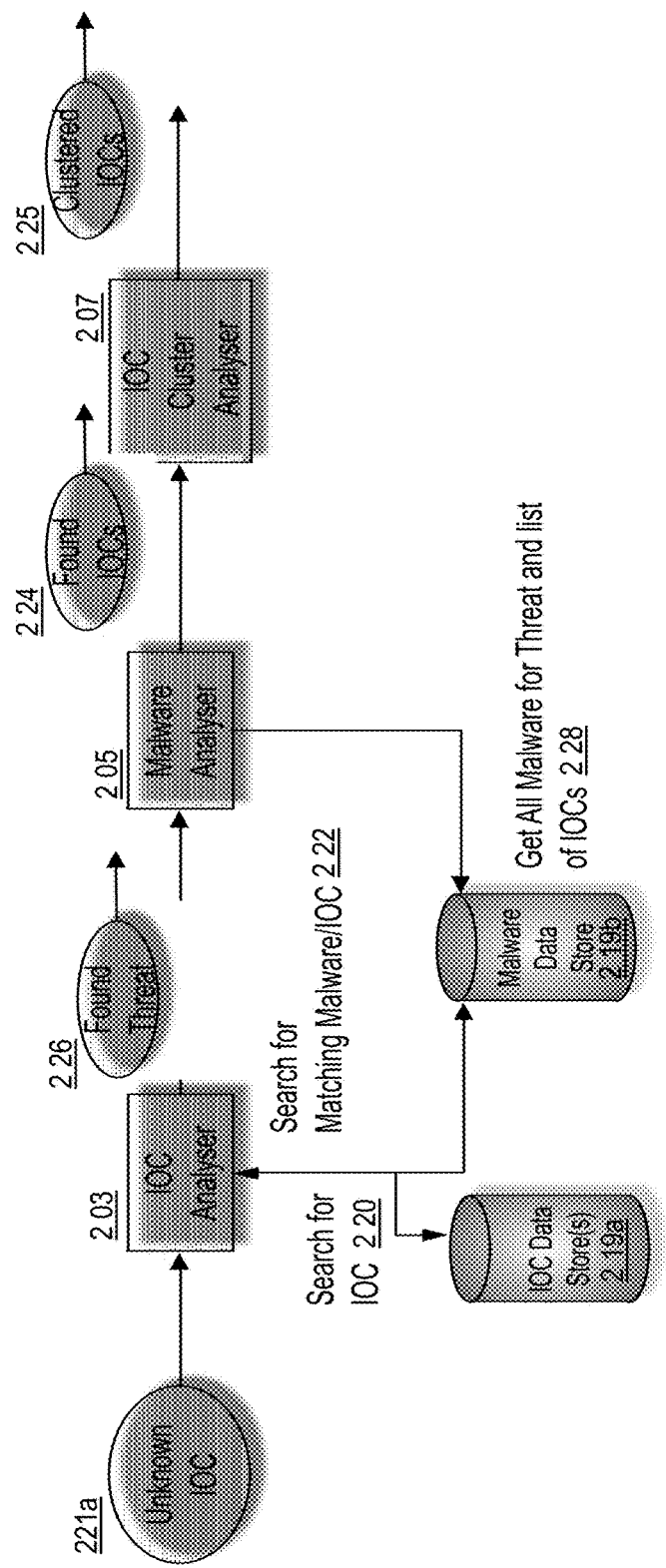
FIG. 2B provides an example combined logic and data message flow diagram illustrating a work flow and message passing between CTIA affiliated entities to generate a group of relevant IOCs in response to an input of unknown IOC, according to an embodiment.

FIG. 2B provides an example combined logic and data flow diagram illustrating a work flow and message passing between CTIA affiliated entities to generate a list of relevant IOCs in response to an input of unknown IOC, according to an embodiment. As shown in FIG. 2B, the CTIA system has two types of inputs, e.g., a specific IOC (for unknown threat), or a type of known threat (with known or unknown IOCs). For example, an unknown IOC 221a (e.g., as the input signal 221 in FIG. 2A) can be input to the IOC analyzer module 203. IOCs to be input to and output from the CTIA system include but are not limited to registry keys, file names, mutexes, or network entities.

The IOC analyzer module 203 may search for IOC (e.g., at 220) and/or matching malware/IOC (222) at the IOC data store 219a. Elements within the IOC data store 219a are related to elements within the malware data store 219b. For example, each sample of malware in the malware data store 219b can have, for example, the SHA256 hash as the unique key, and also stores the associated malware (as automatically determined by the malware analyzer 205). Each IOC in the IOC data store 219a can be related to a SHA256 key.

Upon the searches 220 and 222, the IOC analyzer module 203 can obtain and send a found IOC of the threat (e.g., a malware sample) 224 to the malware analyzer 205, which in turn can retrieve all malware for the threat and a list of all IOCs associated with the found threat, at 228. The found IOCs 224 can be then sent to an IOC cluster analyzer module 207 to generate statistically clustered IOCs 225 from the list of found IOCs 224. Further discussion on generating statistically clustered IOCs is provided in FIGS. 3A-3B and 4A-4B.

In some instances, the threat/malware analyzer module 205 can identify a type of the threat based on the hash provided by the hash identification module 209. For identified threats, the IOC analyzer module 203 can search for all IOCs and/or malware that are associated with the hash identified by the hash identification module 209. The IOC analyzer module 203 can search for all IOCs and/or malware in the IOC data store 219a and malware data store 219b via the data connection 255a. The IOC cluster analyzer module 207 can then refine the searched IOCs and determine a group of statistically relevant IOCs as the output 223.

Figure 3A:
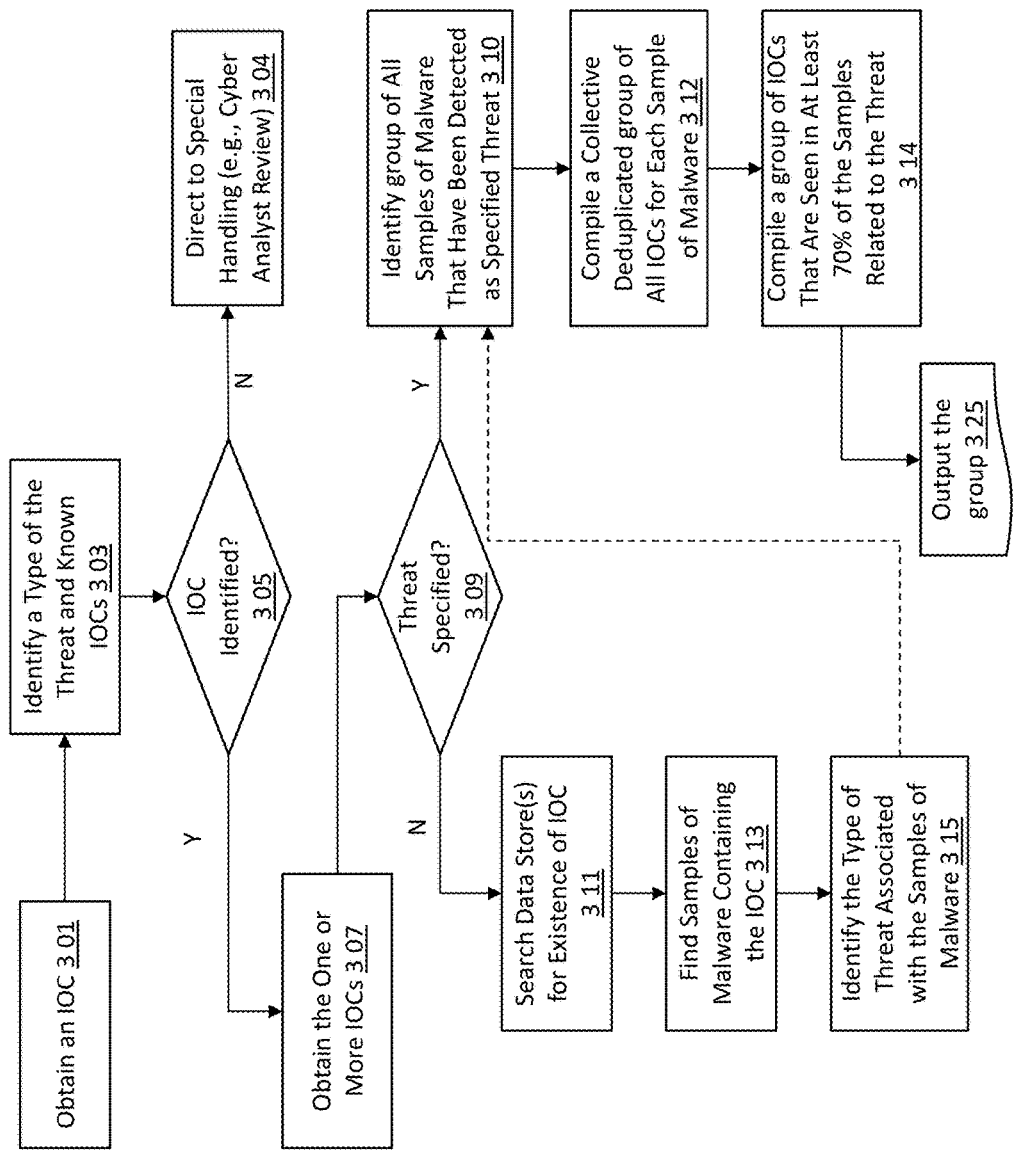
FIGS. 3A-3B provide example logic flow diagrams illustrating logic flows for generating a list of statistically relevant IOCs, according to an embodiment.
Figure 3B:
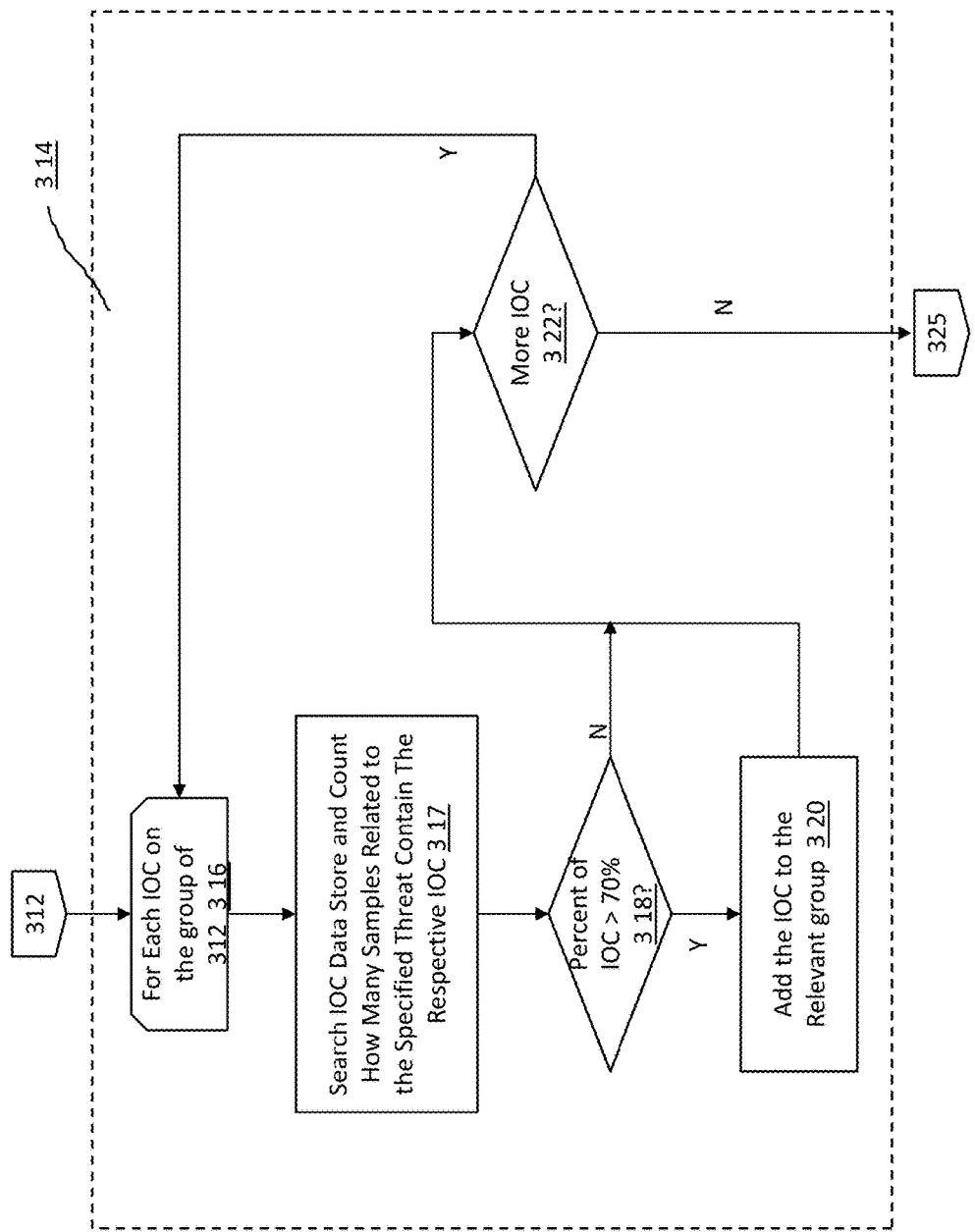

FIGS. 3A-3B provide example logic flow diagrams illustrating work flows for generating a group of statistically relevant IOCs, according to an embodiment. Starting with FIG. 3A, the CTIA system can obtain an IOC at 301 (e.g., from a user computer, etc.), and identify a type of the threat and/or determine whether the IOC is known at 303. For example, the CTIA system can determine whether the IOC includes information (e.g., a network address of the source of the IOC, a hash, and/or the like) that can indicate a type of the threat or identify the IOC.

If the IOC cannot be identified at 305, e.g., the received IOC does not contain a previously identified hash or other information, the IOC can be directed to special handling (e.g., a cyber analyst and/or incident responder can review the IOC and determine a next step to process the IOC, etc.) at 304. If the IOC is identified at 305, for the one or more input IOCs at 307, the CTIA system can determine whether the threat can be specified by the known IOCs at 309 (e.g., whether a sample of malware for the threat is directly identifiable, e.g., from the name of the IOC, a network address of the source of the IOC, etc.).

For unknown threats (threat unspecified at 309), the CTIA system can search an IOC data store (e.g., see 219a in FIGS. 2A-B) for existence of IOCs based on a type of the threat (the type is identified at step 303) at 311. The CTIA system can find samples of malware (e.g., by hash key SHA256) that contains the IOC at 313, and identify the type of threat associated with these samples of malware in the malware data store (e.g., 219b in FIGS. 2A-B), as determined by the malware analyzer (e.g., 205 in FIGS. 2A-2B).

Continuing on with 310, for the group of identified or known threats, the CTIA system can identify a group of all samples of malware, each represented by for example a SHA256 hash, which have been detected as specified threat at 310. For example, the CTIA system can count a total number of hashes (representing all samples of malware) for later IOC grouping. The CTIA system can then compile a collective and deduplicated group of all IOCs from each sample of malware represented by a hash SHA256 at 312, and compile a group of IOCs that reaches a relevance threshold to the threat, e.g., IOCs from the collective and deduplicated group that are seen in at least a threshold percentage (e.g., 50%, 70%, 80%, 90%, etc.) of the samples of malware related to the threat at 314, and send an output message including the group of relevant IOCs at 325.

FIG. 3B further details the logic flows for generating statistically relevant IOCs at step 314. As shown in FIG. 3B, continuing from 312, for each IOC in collective and deduplicated group at 316, the CTIA system can search the IOC data store, and count how many malware samples from the group generated at step 312 related to this threat contain the IOC at 317. If the number of malware samples containing the IOC divided by the total number of malware samples related to the threat (obtained at step 310) is greater than or equal to a threshold percentage (e.g., 50%, 70%, 90%, etc.) at 318, the CTIA system can list the respective IOC as a relevant IOC in response to the IOC input at step 301. For example, the CTIA system can generate a second group of IOCs by recursively inspecting each IOC from the group generated in 312, and then adding relevant IOCs to the group at 320. Otherwise, the number of samples containing the IOC fails to meet a threshold level of relevance at 318, and thus the IOC is not considered as statistically relevant to the identified threat, the CTIA system can then move on to process more IOCs from the group generated at 312, at step 322, which repeats the steps 317-318. When every IOC on the group generated at 312 has been examined, the process proceeds with step 325 in FIG. 3A.

FIGS. 4A-4B provide example logic diagrams illustrating an example of threat lookup and identification based on an initial IOC. Starting with FIG. 4A, a single initial IOC can be received by the CTIA system at 401, e.g., an anti-virus software found a virus on a user computer (e.g., see 131 in FIG. 1A). For example, the CTIA system can then determine the presence of an IOC or threat on a user computer. In the example shown in FIG. 4A, the "C:\WINDOWS\system32\drivers\124b9.sys" registry key is an IOC from behavioral malware analysis of listed hashes (e.g., by the anti-virus software program running on the user computer) under the WINDOWS operating system.

The CTIA system can then determine a characteristic named observation (e.g., hashes, registry keys, file names and paths, mutexes, imported libraries and functions, unique strings, or network entity identifiers including domains and IP addresses) associated with the found IOC at 402, and then determine or identify the threat that this characteristic named observation has been detected as part of the identified threat (in this example, it is Win32/Zbot) at 403. The CTIA system can determine all characteristic named-observations (e.g., hashes, etc.) of malware that have been detected with the same threat as the identified threat Win32/Zbot at 404.

Once all characteristic named-observations of malware associated with the identified threat Win32/Zbot are determined, all IOCs from each characteristic named-observation of malware are compiled and processed at 405, e.g., as a first group of IOCs. Continuing on with FIG. 4B, the group of all IOCs for all Zbot hashes are shown at 405a. The CTIA system then determines statistically relevant IOCs by identifying IOCs from the first group of IOCs (405a) that are found within more than a predetermined threshold (e.g., 50%, 70%, 90%, etc.) of the samples of malware, and these IOCs are put onto a group of IOCs that are statistically relevant (e.g., as discussed at 320 in FIG. 3B). As shown in the above example, the group of statistically relevant IOCs is provided by the CTIA system as an output, to be used by incident responders or threat analysts. Incident responders can have a higher probability of identifying and removing infections of virus with the knowledge of relevant IOCs in response to a received IOC (e.g., at 301 in FIG. 3A).

It is intended that the systems and methods described herein can be performed by software (executed on hardware), hardware, or a combination thereof. Hardware modules can include, for example, a general-purpose processor, a field programmable gates array (FPGA), and/or an application specific integrated circuit (ASIC). Software modules (executed on hardware) can be expressed in a variety of software languages (e.g., computer code), including Clojure, C, C++, Java™, Ruby, Python, JavaScript, Perl, PHP, Visual Basic™, and other object-oriented, procedural, functional, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. An apparatus, comprising:
a processor; and
a memory operatively coupled to the processor, the memory storing processor-readable instructions executable by the processor to:
receive an input message including an indicator of compromise from a source, the indicator of compromise including a characteristic of a malware threat;
identify a type of the malware threat based on the characteristic included in the indicator of compromise in response to the indicator of compromise not including an identifier of the malware threat;

in response to the type of threat being identified based on the characteristic included in the indicator of compromise:

identify a set of samples of malware, from a plurality of sources including the source and stored in a first data storage component storing a plurality of samples of malware including the set of samples of malware, the set of samples of malware being detected as the type of threat identified in the characteristic of the malware threat, for each sample of malware from the set of samples of malware:

identify a unique value associated with the sample of malware;

compile, via a first analyzer implemented on the processor, a first group of previously-stored indicators of compromise associated with the identified samples of malware by retrieving indicators of compromise records, from a second data storage component storing a plurality of previously-stored indicators of compromise including the first group of previously-stored indicators of compromise, that are associated with the unique value of each sample of malware from the set of samples of malware;

compile, via a second analyzer implemented on the processor, a second group of previously-stored indicators of compromise that are statistically relevant to the malware threat by selecting a subset of indicators of compromise from the first group of previously-stored indicators based on a threshold percentage of the set of samples of malware to which each indicator of compromise from the subset of indicators of compromise is associated;

generate an output message including the second group of previously-stored indicators of compromise in response to the input message; and send the output message to an incident responder for the incident responder to identify the malware threat based on the second group of previously-stored indicators of compromise.

2. The apparatus of claim 1, wherein the indicator of compromise includes any of a specific indicator of compromise for an unknown threat, a type of threat with a known indicator of compromise, or a type of threat with an unknown indicator of compromise.

3. The apparatus of claim 1, wherein the input message includes an alert from a security monitor or detection component that finds an instance of malware on a computer.

4. The apparatus of claim 1, wherein the characteristic of the malware threat includes one of registry keys, file names and paths, mutual exclusion objects (mutexes), imported libraries and functions, unique strings, hashes of samples of malware, or network entity identifiers including domains and Internet Protocol (IP) addresses.

5. The apparatus of claim 1, wherein the unique value is a hash key including any of message digest 5 (MD5), Secure Hash Algorithm 1 (SHA1), Secure Hash Algorithm 256 (SHA256) or Secure Hash Algorithm 512 (SHA512).

6. The apparatus of claim 1, wherein:

the unique value is a hash key including any of message digest 5 (MD5, Secure Hash Algorithm 1 (SHA1), Secure Hash Algorithm 256 (SHA256) or Secure Hash Algorithm 512 (SHA512), and each previously-stored indicator of compromise from the first group of the previously-stored indicators of compromise is related to the hash key.

7. The apparatus of claim 1, wherein the processor-readable instructions are further executable by the processor to:

count a total number of samples of malware in the set of samples of malware that have been detected as the type of threat identified in the characteristic of the malware threat; and prepare the second group of previously-stored indicators based on the total number of samples of malware in the set of samples of malware that have been detected as the type of threat identified in the characteristic of the malware threat.

8. The apparatus of claim 1, wherein the first group of previously-stored indicators of compromise includes a collective and deduplicated group of all indicators of compromise associated with each sample of the malware in the set of samples of malware that have been detected as the type of threat identified in the characteristic of the malware threat.

9. The apparatus of claim 1, wherein the processor-readable instructions are further executable by the processor to:

send the output message to an entity for the entity to monitor a computer environment at the entity to detect the threat based on the second group of previously-stored indicators of compromise from the output message.

10. The apparatus of claim 1, wherein the indicator of compromise includes behavioral malware analysis results data obtained from the malware threat, the behavior malware analysis results including an identification of behaviors of the malware threat, the behaviors including at least one of (1) adding a data file to the source, (2) deleting a data file from the source, (3) adding a registry key to the source, (4) removing a registry key from the source, and (5) network activity by the source.

11. The apparatus of claim 1, wherein the identifier is a previously-identified characteristic.

12. The apparatus of claim 1, wherein the plurality of previously-stored indicators of compromise are derived from the plurality of samples of malware stored in the first data storage component.

13. A processor-implemented method, comprising:

identifying presence of an indicator of compromise at a source;

determining a characteristic of a malware threat that is included in the first indicator of compromise;

forming a query on a plurality of previously-identified samples of malware, from a plurality of sources and stored in a first data storage component, based on the characteristic of the malware threat identified at the source, to identify a type of malware that is associated with the characteristic of the malware threat;

identifying the type of malware associated with the characteristic of the malware threat based on the query;

identifying a set of previously-identified samples of malware from the plurality of previously-identified samples of malware stored in the first data storage component, that are associated with the identified type of malware;

for each sample of malware in the set of previously-identified samples of malware:

identifying a unique value associated with the sample of malware;

determining, via a first analyzer, a set of indicators of compromise via retrieving indicators of compromise from a second data storage component storing a plurality of previously-stored indicators of compromise including the set of indicators of compromise, so as to associate each retrieved indicator of compromise with the unique value associated with the sample of malware;

selecting, via a second analyzer, an output group of statistically relevant indicators of compromise from the set of indicators of compromise based on a threshold percentage of the set of previously-identified samples of malware to which each indicator of compromise selected for the output group is associated; and outputting the output group of statistically relevant indicators of compromise for the incident responder to identify the malware threat based on the output group of statistically relevant indicators of compromise.

14. The method of claim 13, wherein the indicator of compromise includes any of a specific indicator of compromise for an unknown threat, a type of threat with a known indicator of compromise, or a type of threat with an unknown indicator of compromise.

15. The method of claim 13, wherein the characteristic of the malware threat includes any of registry keys, file names and paths, mutual exclusion objects (mutexes), imported libraries and functions, unique strings, or network entity identifiers including domains and Internet Protocol (IP) addresses.

16. The method of claim 13, wherein the unique value associated with each sample of malware from the set of previously-identified samples of malware is a previously-stored hash of samples of malware of identified threats.

17. The method of claim 13, wherein the characteristic of the malware threat includes any hash of malware.

18. A system, comprising:
one or more hardware processors;
a memory operatively coupled to the one or more hardware processors;
an indicator-of-compromise analyzer implemented on the one or more hardware processors and configured to receive an indicator of compromise from a source and search a data storage component of previously-stored indicators of comprise, for the indicator of compromise, so as to identify a type of malware associated with the indicator of compromise;
a threat analyzer operatively coupled to the indicator-of-compromise analyzer and implemented on the one or more hardware processors, the threat analyzer configured to search a data storage component of malware information based on the identified type of malware, to identify a set of samples of malware stored in the data storage component of malware information and received from a plurality of sources including the source, the set of samples of malware being detected as being the type of malware, the threat analyzer configured to compile a first group of previously-stored indicators of compromise associated with the set of the samples of malware detected as being the type of malware by retrieving indicators of compromise associated with at least one unique value associated with at least one sample of malware from the set of the samples of malware; and
a cluster analyzer implemented on the one or more hardware processors and operatively coupled to the threat analyzer, the cluster analyzer configured to generate an output group of statistically clustered indicators of compromise from the first group of previously-stored indicators of compromise by selecting a subset of indicators of compromise from the first group of previously-stored indicators of compromise based on a threshold percentage of the set of samples of malware to which each indicator of compromise from the subset of indicators of compromise is associated, the cluster analyzer configured to output the output group of statistically clustered indicators of compromise for the incident responder to identify the malware threat based on the output group of statistically clustered indicators of compromise.

19. The system of claim 18, wherein the data storage component of previously-stored indicators of compromise includes data elements related to elements stored in the data storage component of malware information.

20. The system of claim 18, wherein the characteristic of the malware threat includes any of registry keys, file names and paths, mutual exclusion objects (mutexes), imported libraries and functions, unique strings, hashes of samples of malware, or network entity identifiers including domains and Internet Protocol (IP) addresses.

21. The system of claim 18, wherein the at least one unique value a hash key including any of a message digest 5 (MD5) key, a Secure Hash Algorithm 1 (SHA1) key, a Secure Hash Algorithm 256 (SHA256) key, or a Secure Hash Algorithm 512 (SHA512) key.

* * * * *